United States Patent [19]

Bean et al.

[11] Patent Number: 5,595,561
[45] Date of Patent: Jan. 21, 1997

[54] LOW-TEMPERATURE METHOD FOR CONTAINING THERMALLY DEGRADABLE HAZARDOUS WASTES

[75] Inventors: Dennis L. Bean; Lillian D. Wakeley; Judy C. Tom; Melvin C. Sykes; William N. Brabston; Philip G. Malone, all of Vicksburg, Miss.

[73] Assignee: The United States of America as represented by the Secretary of the Army, Washington, D.C.

[21] Appl. No.: 521,302

[22] Filed: Aug. 29, 1995

[51] Int. Cl.⁶ ................ B09B 3/00; G21F 9/00
[52] U.S. Cl. ................ 588/255; 588/3; 588/6; 588/252; 588/259; 106/697
[58] Field of Search .................. 588/3, 4, 6, 14, 588/16, 252, 255, 256, 257, 259; 106/608, 697, 708, 709

[56] References Cited

U.S. PATENT DOCUMENTS

| | | |
|---|---|---|
| 4,290,908 | 9/1981 | Horiuchi et al. . |
| 4,363,757 | 12/1982 | Koster et al. . |
| 4,379,081 | 4/1983 | Rootham et al. . |
| 4,496,477 | 1/1985 | Ross . |
| 4,530,723 | 7/1985 | Smeltzer et al. . |
| 4,632,779 | 12/1986 | Mizuno et al. . |
| 4,652,404 | 3/1987 | Mallek et al. . |
| 4,671,897 | 6/1987 | Mori et al. . |
| 4,839,102 | 6/1989 | Kertesz et al. . |
| 4,904,416 | 2/1990 | Sudo et al. ............ 210/751 X |
| 5,008,045 | 4/1991 | Manchak, Jr. et al. ........ 588/4 |
| 5,164,123 | 11/1992 | Goudy, Jr. . |
| 5,169,566 | 12/1992 | Stucky et al. ............ 588/252 X |
| 5,196,620 | 3/1993 | Gustin et al. ............ 588/257 |
| 5,269,975 | 12/1993 | Noakes ............ 528/252 X |
| 5,346,549 | 9/1994 | Johnson ............ 106/708 |
| 5,414,197 | 5/1995 | Wakeley et al. ............ 588/3 |
| 5,498,828 | 3/1996 | Matsuda et al. ............ 588/252 |

*Primary Examiner*—George A. Suchfield
*Attorney, Agent, or Firm*—Luther A. Marsh

[57] ABSTRACT

A low-temperature method for producing coated hazardous waste pellets which are used as the aggregate in a concrete wasteform is characterized by combining hazardous waste with a chemically setting organic polymer to form a mixture which is formed into pellets. The pellets are first coated with epoxy and then coated with a silicate-based powder. The liquid concrete-pellet mixture is then placed in molds which can be rotated to concentrate the pellets away from the perimeter of the wasteform. The double-coated hazardous waste pellets have improved bonding when used as a coarse aggregate in a concrete mixture. The resulting wasteform is self-supporting and needs no external container for transportation, storage, or disposal.

9 Claims, 1 Drawing Sheet

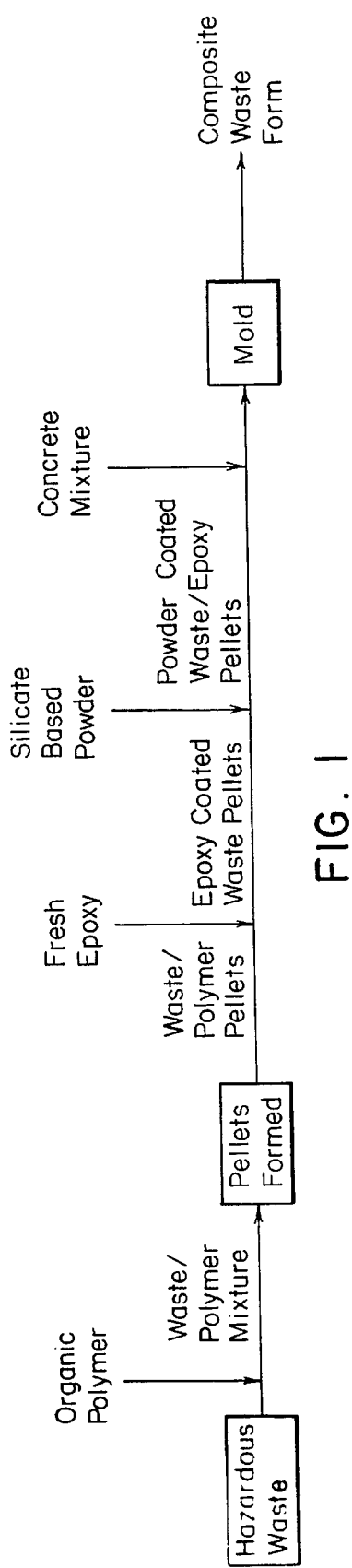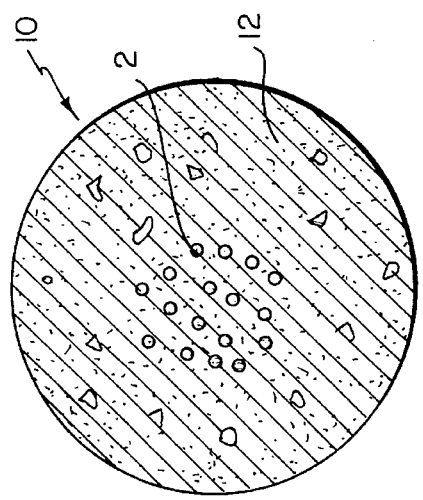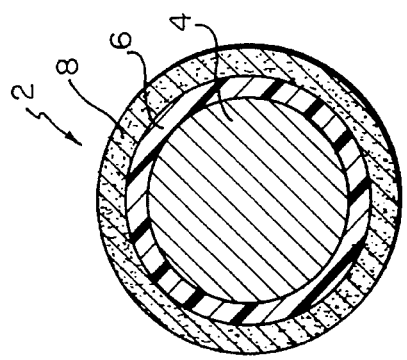

LOW-TEMPERATURE METHOD FOR CONTAINING THERMALLY DEGRADABLE HAZARDOUS WASTES

BACKGROUND OF THE INVENTION

The present invention relates to a method for containing or isolating thermally degradable toxic or radioactive wastes and, in particular, to an encapsulated hazardous waste pellet which is suitable for use as an aggregate in concrete mixture.

The need to safely dispose of hazardous wastes, including toxic and radioactive waste salts, is well known. Current attempts to make a safe wasteform for disposal of these hazardous wastes involve either (1) mixing particulate wastes or waste slurries into a portland cement-based mortar, or (2) drying the wastes and blending the solids with a thermosetting polymer such as asphalt or polyethylene. These techniques, however, are unsatisfactory.

Portland, cement-based wasteforms often have problems with the chemical interaction of the waste and the cement. For example, some wastes contain compounds that inhibit the hardening of the portland cement or compromise the strength of the resulting hydrated cement mixture. Further, although the waste-cement mixtures may form coherent masses, there is the problem of rainwater or groundwater infiltrating the mass and leaching soluble salts into the surrounding soil or groundwater.

Thermosetting polymer wasteforms such as asphalt-salt composites, while generally effective in preventing moisture from contacting the waste, cannot be used with waste salts that decompose when heated. Moreover, polymer-waste composites generally have to be enclosed in a container such as a steel drum for transportation and disposal. The drum adds to the cost of the wasteform and provides only temporary (15 to 20 year) containment if the drums are buried. Waste salts that are oxidizers (e.g. nitrates, chlorates) can form potentially flammable mixtures that can burn without access to air. Salts such as nitrates mixed with asphalt or plastic are the equivalent of a solid rocket fuel. If a drum of mixed organic compounds and oxidizers were to ignite, it would be very difficult to contain the resulting fire, and hazardous wastes would be released in the smoke and fumes produced.

When radioactive wastes are incorporated in asphalt or other organic polymers, the radiation breaks down the organic polymer and can generate hydrogen gas. If the wasteform is sealed in a drum, hydrogen gas can accumulate and pressurize the drum, creating a serious safety problem.

Organic polymer wasteforms are developed for long-term containment of waste which will be hazardous for hundreds of years. The possibility exists, therefore, that the wasteforms may be excavated at some future date when the nature of the material has been forgotten. If the wasteform is ever put to use where it can expose humans to hazards due to the waste's toxicity or radioactivity, a great deal of harm can be done unintentionally. Drums of hardened organic polymer may be inviting targets for reclamation in the future because they resemble uncontaminated material.

Concrete-based wasteforms have been favored over polymer-based wasteforms because the relatively high pH maintained in the concrete reduces solubility of many metal salts that are common in wastes and are a problem in the environment. For example, cadmium and lead are typically more soluble in-acid than in alkaline aqueous systems. It has not been possible to develop this type of chemical barrier with organic polymer encapsulation.

Typically, waste-asphalt composites (the most commonly used organic polymer system) will contain between 40% and 60% waste by weight In some cases it is useful to have an outer layer of uncontaminated material surrounding the waste to improve waste isolation and, in the case of radioactive wastes, to provide radiation shielding.

The present invention incorporates waste pellets coated with epoxy and powdered silicate in a concrete mixture. The powder coating of the pellets allows the pellets to be handled, separated, and distributed in the cementitious matrix. Without the coating, the pellets adhere to one another and cannot be efficiently distributed into the mixture. The coating of powdered silicate bonds to the surrounding concrete and creates an additional barrier to the movement of wastes out of the pellets.

BRIEF DESCRIPTION OF THE PRIOR ART

Various methods for disposal of hazardous waste are disclosed in the patented prior art. It is also known to form the pellets of waste and to encase the pellets in a solidifying liquid. The Horiuchi et al U.S. Pat. No. 4,290,908, for example, discloses a method for treating radioactive wastes in which the waste is first pelletized and then stored in a vessel which is injected with a binder to effect solidification.

The Koster et al U.S. Pat. No. 4,363,757 discloses a method for solidifying and storing radioactive liquids in which the waste liquids are first mixed with absorbing agents to form granules or pellets. The pellets are then clad in a first binder and thereafter embedded for final solidification in a second binder which is initially in a liquid state and later hardens.

The Johnson U.S. Pat. No. 5,346,549 discloses a method for producing a pellet from coal ash and paper mill waste which can be used as an aggregate in a concrete mixture. The method includes adding a cation exchange resin to the paper mill sludge-coal ash mixture and forming this mixture into pellets.

The patented prior art also teaches encapsulating or surface coating pellets formed of hazardous wastes to improve containment of the waste and to provide the pellets with properties which enhance their use in asphalt or concrete mixtures. The Gustin et al U.S. Pat. No. 5,196,620, for example, discloses treating the surface of a pellet formed of municipal solid waste ash with a coating of one or more materials to enhance the pellet's use as an aggregate in an asphalt or concrete mixture.

The Goudy, Jr. U.S. Pat. No. 5,164,123 discloses a method of encapsulating a toxic material with a resinous plastic to provide protection against leaching of the waste from the pellet wherein the toxic material is admixed and coated with the resinous plastic to result in an encapsulated product having a protective skin thereover.

None of the prior methods, however, provide a low temperature method for safely and effectively containing both toxic and radioactive wastes indefinitely in a concrete wasteform without the aid of containment vessel. The present invention was developed to overcome these and other drawbacks. It provides hazardous waste pellets having a core formed of a mixture of hazardous waste and an organic polymer. These pellets have a first outer coating of epoxy, and a second outer coating of silicate-based powder. The resulting double-coated pellets can be used as aggregate in a concrete mixture.

SUMMARY OF INVENTION

Accordingly, it is a primary object of the present invention to provide a low-temperature method for producing a wasteform capable of safely and effectively storing both toxic and radioactive wastes indefinitely. More particularly, it is an object of the present invention to provide a method for producing a concrete wasteform including the steps of adding an organic polymer to the hazardous waste, forming pellets from the waste-polymer mixture, treating the pellets with an epoxy coating, treating the epoxy-coated pellets with a silicate-based powder, and using the pellets as the aggregate in a concrete mixture.

It is another object of the present invention to provide a method of producing a coated pellet having a hazardous waste-organic polymer center formed using a chemically setting, organic polymer.

It is a further object of the present invention to provide a concrete wasteform in which the hazardous waste pellets are concentrated near the center of the wasteform.

BRIEF DESCRIPTION OF THE FIGURES

Other objects and advantages of the invention will become apparent from a study of the following specification when viewed in the light of the accompanying drawing, in which:

FIG. 1 is a schematic flow chart illustrating the method according to the invention;

FIG. 2 is a sectional view of the pellet produced by the invention; and

FIG. 3 is a sectional view of the concrete wasteform produced by the invention.

DETAILED DESCRIPTION

Referring first to FIG. 1, hazardous wastes, such as toxic or radioactive waste salts, which have been designated for disposal or indefinite storage, are collected as a salt or other solid. An organic polymer is added to the waste to form a waste-polymer mixture. Since thermally setting organic polymers produce heat sufficient to decompose some thermally degradable waste salts, a chemically setting organic polymer, such as an epoxy, is typically used to form the waste-polymer mixture. In this manner, thermally degradable wastes can be processed at room temperature (approximately 23 degrees Celsius). There is no need to heat the waste as is the case when thermally setting polymers are used.

The waste-polymer mixture is formed into pellets of a size that can be used as an aggregate in making a portland cement-based concrete. The pellets typically have a diameter ranging from 5 to 15 millimeters. Since the pellets formed typically have such a small diameter, any heat generated in the polymerization of the epoxy coating is quickly dissipated without raising the temperature of the pellets high enough to decompose thermally degradable wastes.

The pellets are then allowed to partly harden and are coated with fresh epoxy resin. The epoxy-coated, polymer-waste pellets are then coated with a dry, non-swelling, silicate-based power such as ground slag, fly ash, or portland cement to form a powder-coated epoxy-waste pellet.

As shown in FIG. 2, the resulting composite hazardous waste pellet 2 includes an inner core portion 4 formed of hazardous waste-organic polymer mixture, an intermediate layer of epoxy 6 surrounding the core to seal and protect the core from moisture and leaching, and an outer coating of silicate-based powder 8 covering the intermediate layer. This outer coating produces a surface which improves the bond between the coated pellet and the cement which allows the pellet to be used as aggregates in a concrete mixture.

The pellets are coated, for example, by placing the epoxy-coated pellets in containers of powder. To ensure that the powder adheres to the fresh epoxy to form a thorough coating around the pellet, the pellet-powder mixture is agitated or otherwise mixed. The pellet-powder mixture is allowed to stiffen and the pellets are then separated from the mixture in a known manner such as by passing the mixture through a sieve with suitable openings to retain the pellet and pass the powder.

The powder coating provides the pellets with a surface which prevents the pellets from adhering to each other. This non-adhering characteristic allows the pellets to be dispersed through a concrete mixture. The coated epoxy pellets are used as coarse aggregate in a concrete mixture that contains cement, sand as fine aggregate, and mixtures such as water reducers or retarders which might be necessary to make the mixture workable.

The concrete mixture is then placed in molds of an appropriate size for casting monoliths suitable for storage or burial. The mixture is allowed to harden and gain strength prior to removal from the molds for transportation. In addition, since the pellets are much less dense than the fluid concrete mixture, the mold can be rotated to force the pellets toward the center and away from the perimeter of the wasteform. This fabrication technique provides a wasteform which is safer to handle, is less likely to lose waste through diffusion, and provides additional concrete shielding on the exterior of the wasteform.

As shown in FIG. 3, the resulting wasteform 10 has an outer layer of uncontaminated concrete 12 with the pellet 2 concentrated near the central part of the cast mass.

Alternatively, the pellets can be placed in the mold first and the mold then filled with a portland cement-based grout that is forced into the mass of the pellets. This modification allows the maximum possible waste loading to be achieved in the wasteform.

The final result of this operation is a wasteform in which the waste is encapsulated in both a polymer which prevents undesirable leaching of the waste from the wasteform, and concrete. The wasteform is self-supporting so that no container, such as a steel drum, is needed for disposal or transportation. Moreover, the concrete matrix will not corrode as would a steel drum.

Waste salts that are oxidizers, such as nitrates or chlorates, can form potentially flammable mixtures that can burn without access to air. By using this method to isolate each pellet in the concrete matrix, the chances for having the organic polymer-oxidizer mixture burn are greatly reduced. With the contact between pellets reduced, a large, continuous fire becomes much less likely, although individual exposed pellets may burn if ignited.

When radioactive wastes are incorporated in any organic polymer, the radiation breaks down the organic polymer and can generate hydrogen gas. If the wasteform is sealed in a drum, the hydrogen gas can accumulate and pressurize the drum, creating a serious safety problem. The present concrete wasteform, by eliminating the need for a steel drum, allows the hydrogen to diffuse out of the wasteform without producing dangerous gas accumulation or pressurized containers.

While in accordance with the provisions of the patent statute the preferred forms and embodiments have been illustrated and described, it will be apparent to those of ordinary skill in the art that various changes and modifications may be made without deviating from the inventive concept set forth above.

What is claimed is:

1. A hazardous waste pellet, comprising:
   (a) a core formed of a mixture of hazardous waste and an organic polymer;
   (b) an intermediate layer of epoxy surrounding said core; and
   (c) an outer coating of silicate-based powder covering said intermediate layer, whereby said pellet can be used as an aggregate in a concrete mixture.

2. A waste pellet as defined in claim 1, wherein said pellet has a diameter of generally 5 to 15 millimeters.

3. A waste pellet as defined in claim 1, wherein said organic polymer is chemically setting.

4. A composite wasteform for storage and disposal of hazardous waste, comprising
   a plurality of coated hazardous waste pellets dispersed in a containment medium, said waste pellets comprising:
   (a) a core formed of a mixture of hazardous waste and an organic polymer;
   (b) an intermediate layer of epoxy surrounding said core; and
   (c) an outer coating of silicate-based powder covering said intermediate layer, whereby said pellet can be used as an aggregate in a concrete mixture.

5. A composite wasteform as defined in claim 4, wherein said containment medium is concrete mixture.

6. A composite wasteform as defined in claim 4, wherein said waste pellets are concentrated near the center of said wasteform.

7. A method for forming a composite wasteform for storage and disposal of thermally degradable hazardous waste, comprising the steps of:

(a) processing the hazardous waste at room temperature to form a plurality of separate pellets;
   (b) mixing said pellets with a solidifiable liquid to form a pellet-liquid mixture; and
   (c) allowing said liquid to solidity, whereby said pellets are encased in the composite wasteform;
   (d) maintaining said liquid at a density greater than the density of said pellets;
   (e) pouring said pellet-liquid mixture into a rotatable mold and rotating said mold, whereby said pellets become concentrated away from the perimeter of the wasteform; and
   (f) wherein said solidifiable liquid is a concrete mixture.

8. A method for producing a composite wasteform as defined in claim 7, wherein said processing steps include:
   (1) combining the hazardous waste with a chemically setting organic polymer to form a hazardous waste-organic polymer mixture, whereby potential decomposition of the hazardous waste is avoided;
   (2) forming said hazardous waste-organic polymer mixture into pellets;
   (3) allowing said pellets to partially harden;
   (4) coating said partially hardened pellets with an epoxy resin; and
   (5) coating said pellets with a silicate-based powder.

9. A method for producing a composite wasteform as defined in claim 8, wherein said chemically setting organic polymer comprises an epoxy resin.

* * * * *